United States Patent [19]

Kovacs et al.

[11] Patent Number: 5,006,406
[45] Date of Patent: Apr. 9, 1991

[54] MAGNETIC RECORDING MEDIA

[75] Inventors: Jenoe Kovacs, Hessheim; Milena Melzer, Ludwigshafen; Werner Balz, Limburgerhof; Werner Lenz, Bad Duerkheim; Werner Loch, Erpolzheim; Helmut Jakusch, Frankenthal, all of Fed. Rep. of Germany

[73] Assignee: BASF Aktiengesellschaft, Fed. Rep. of Germany

[21] Appl. No.: 243,094

[22] Filed: Sep. 12, 1988

[51] Int. Cl.$^5$ .............................................. G11B 23/00
[52] U.S. Cl. .................................. 428/323; 428/329; 428/694; 428/695; 428/900
[58] Field of Search ............... 428/694, 695, 900, 323, 428/329; 252/62.53

[56] References Cited

U.S. PATENT DOCUMENTS

| | | | |
|---|---|---|---|
| 4,315,052 | 2/1982 | Takahashi et al. | 428/328 |
| 4,333,961 | 6/1982 | Bruce et al. | 427/131 |
| 4,420,532 | 12/1983 | Yamaguchi et al. | 428/329 |
| 4,425,400 | 1/1984 | Yanaguchi et al. | 428/329 |
| 4,537,833 | 8/1985 | Kasuga et al. | 428/695 |
| 4,645,611 | 2/1987 | Campbell et al. | 252/62.53 |
| 4,652,500 | 3/1987 | Ejiri et al. | 428/695 |
| 4,666,754 | 5/1987 | Arioka et al. | 428/695 |
| 4,734,126 | 3/1988 | Holmwood | 71/92 |

FOREIGN PATENT DOCUMENTS 2153804 8/1985 United Kingdom .

*Primary Examiner*—Paul J. Thibodeau
*Attorney, Agent, or Firm*—Keil & Weinkauf

[57] ABSTRACT

In magnetic recording media which have at least one magnetizable layer firmly applied to a nonmagnetic base, the magnetizable layer essentially consists of a magnetic material finely dispersed in an organic polymer binder, a dispersant, a lubricant and other conventional additives.

1 Claim, No Drawings

MAGNETIC RECORDING MEDIA

The present invention relates to magnetic recording media which have at least one magnetizable layer firmly applied to a nonmagnetic base, the magnetizable layer essentially consisting of magnetic material finely dispersed in an organic polymer binder, a dispersant and a lubricant and other conventional additives.

In the production of magnetic recording media which consist of a base, which is generally flexible, and a magnetic layer of one or more magnetic powders and one or more organic binders coating these powders, very finely divided powders are increasingly being used. Compared with the conventional coarse powders, these magnetic powders possess a better signal-to-noise ratio in the case of audio and video tapes and better resolution in the case of data media. This permits the production of magnetic recording media which are suitable for high recording densities and also have an improved signal-to-noise ratio. In magnetic layers of this composition, however, the layer surface has very low abrasion resistance. Particularly in video tapes, this results in poor durability, damage to the layer during contact with the heads and other parts and smearing or even clogging of the head by abraided material from the layer. These difficulties are particularly accentuated in a thermal cycling test.

In order to overcome these disadvantages, it has often been proposed to increase the hardness of the layer by adding hard nonmagnetic oxide particles. For example, DE-A 32 11 780 describes the addition of abrasives having a Mohs hardness of not less than 6 in order to improve the life of the magnetic layer. Suggested abrasives include α-iron(III) oxide as well as alumina, silica, chromium dioxide and silicon carbide. Although this results in a stronger magnetic layer, the addition of these abrasive particles also leads to greater abrasion of the head.

The improvement in the abrasion resistance of the magnetic layer in conjunction with a reduced abrasive effect of the layer on the head is said to be possible, according to DE-A 31 28 005 and DE-A 32 17 209, with the aid of a combination of different nonmagnetic, hard, finely divided powders having a Mohs hardness of not less than 6. The addition of fatty acid and a fatty acid ester in addition to the abrasive material has also been described (DE-A 32 11 779), as has the further combination with calcium carbonate (DE-A 32 02 601) or mixing of the abrasion-resistant metal oxide with ethylene stearyl diamide (DE-B 30 24 078). Although these proposals solve the stated problems, they are unsatisfactory if the overall properties of the magnetic recording medium, such as the mechanical, electroacoustic and video properties, and the interaction with the recording/playback apparatus are taken into account.

It is an object of the present invention to provide magnetic recording media which have one or more magnetizable layers firmly applied to a nonmagnetic base, the composition of the magnetizable layer being such that it does not have the stated disadvantages and in particular optimally meets the requirements set with regard to its mechanical strength and its recording and playback properties as well as its effect on, and the way in which it is affected by, the recorder parts with which it comes into contact.

We have found that this object is achieved by a magnetic recording medium comprising a nonmagnetic base and, firmly applied thereon, at least one magnetizable layer consisting essentially of magnetic material finely dispersed in an organic binder, a dispersant, a lubricant and other conventional additives, if the magnetizable layer comprises 1. at least one finely divided magnetic material having a BET specific surface area of not less than 25 $m^2/g$,
2. at least one finely divided nonmagnetic metal oxide having a Mohs hardness greater than 5 and a BET specific surface area of not less than 2 $m^2/g$, in an amount of from 1 to 20% by weight, based on the amount of magnetic material,
3. at least one lubricant from the group consisting of the silicone resins, polyethylene waxes, paraffins and metal salts of stearic, oleic and myristic acid, in an amount of from 1 to 10% by weight, based on the amount of magnetic material, and
4. a comb block copolymer based on a polyethyleneimine chain having a molecular weight of not less than 2,000 and having polyamide and/or polyester side chains having a molecular weight of not less than 500, as a dispersant, in an amount of from 1 to 20% by weight, based on the amount of magnetic material.

As a result of the interaction of the four components typical of the novel magnetic recording media, it was possible, surprisingly, to achieve the required, advantageous properties of these recording media. For example, the novel magnetic recording media are distinguished by a uniform and homogeneous coating. The layer surface is smooth and has a roughness of less than 0.15 μm and no defects, such as protuberances and the like. The scratch-resistance of the layer is particularly noteworthy. These improvements in the layer quality are particularly evident when the novel recording media are used as video tapes. This makes it possible to achieve improved signal to noise ratios and a better modulation noise and substantially to improve the still life and the durability.

The magnetic materials used are the known, ferrimagnetic, acicular iron oxides, such as magnetites, bertholides and in particular gamma-iron oxides, preferably in cobalt-modified form, having coercive forces of more than 28 kA/m, and barium ferrites as well as the ferromagnetic materials, such as acicular chromium dioxide and acicular iron particles, advantageously as alloys with cobalt and/or nickel. An essential precondition with regard to the suitability of the stated magnetic materials is the BET specific surface area $S_{N2}$, which must be not less than 25 $m^2/g$, measured according to DIN 66,132 with the aid of a Ströhlein areameter by the one-point difference method according to Haul and Dümbgen. The proportion of magnetic material in the total amount of the magnetic layer is from 70 to 80%.

In addition to these magnetic materials, other solids present in the magnetic layer are from 1 to 20, preferably from 8 to 15, % by weight, based on the amount of the magnetic material, of finely divided, preferably spherical or cubic, nonmagnetic metal oxides, for example $Al_2O_3$, $ZrO_2$, $Cr_2O_3$ or $\alpha\text{-}Fe_2O_3$. It is also possible to use other conventionally employed oxides. To be suitable for use in the novel magnetic recording media, they must have a Mohs hardness of more than 5 and a BET specific surface area $S_{N2}$ greater than 2, preferably from 5 to 12, $m^2/g$. The mean particle size is from 0.1 to 1.8, advantageously from 0.3 to 1.5, μm.

The abovementioned compounds are used as lubricants, in an amount of from 1 to 10, preferably from 2 to 5, % by weight, based on the amount of magnetic material. Regardless of these substances, it may be advantageous to use other conventional lubricants, such as carbon black or polymers grafted on carbon black, or fine inorganic powders, such as molybdenum disulfide or tungsten disulfide, fine synthetic resin powders, such as ethylene/vinyl chloride copolymers or polytetrafluoroethylene, α-olefins, unsaturated aliphatic hydrocarbons which are liquid at room temperature, aliphatic carboxylates of monobasic aliphatic acids of 12 to 20 carbon atoms and monohydric alcohols of 3 to 12 carbon atoms. The total amounts of lubricants must not, however, exceed 20, preferably 10, % by weight.

The amount of comb block copolymers in the magnetizable layer is from 1 to 20, preferably 2 to 15, % by weight, based on the amount of magnetizable material. The suitable compounds are composed of a polyethyleneimine chain as a basic skeleton, having a molecular weight of not less than 2,000, advantageously from 6,000 to 25,000, and having side chains based on polyester and/or polyamide, each of which has a molecular weight of not less than 500, advantageously from 800 to 2,000. These comb block copolymers are known and are described in, inter alia, GB-A 2 153 804. It may also be advantageous to use other dispersants, such as aliphatic acids of 12 to 18 carbon atoms, their metal soaps, their fluorinated ester derivatives and their amides or alkylene oxide/alkylphosphoric esters, lecithin or quaternary ammonium sulfates of trialkylpolyolefin oxides and higher alcohols of 12 or more carbon atoms and their sulfates.

The organic binders which are used for the production of magnetizable layers are polyvinylformals, polyurethane elastomers, mixtures of polyisocyanates and fairly high molecular weight polyhydroxy compounds with vinyl chloride polymers having more than 60% of vinyl chloride molecular building blocks, for example vinyl chloride copolymers with vinyl esters of monocarboxylic acids of 2 to 9 carbon atoms, esters of aliphatic alcohols of 1 to 9 carbon atoms, and ethylenically unsaturated carboxylic acids of 3 to 5 carbon atoms, such as the esters of acrylic acid, methacrylic acid or maleic acid, or these carboxylic acids themselves as comonomers, and hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate. Other suitable binders are mixtures of the stated polymers. Preferred binders are polyvinylformal binders and polyurethane elastomer mixtures of the stated type, especially with polyvinylformals. Preferably used polyurethane elastomer binders are commercial elastomeric polyurethanes obtained from adipic acid, 1,4-butanediol and 4,4'-diisocyanatodiphenylmethane. Suitable organic solvents for the preparation of the dispersion are the organic solvents known for this purpose, in particular aromatic hydrocarbons, such as benzene, toluene or xylene, alcohols, such as propanol or butanol, ketones, such as acetone or methyl ethyl ketone, ethers, such as tetrahydrofuran or dioxane, and mixtures of such solvents.

The magnetizable layers are produced in a known manner. For this purpose, the magnetic material is dispersed with the binder and sufficient solvent in a dispersing apparatus, for example a ball mill or a stirred ball mill, with the addition of the dispersant and the other additives. To obtain the advantageous binder/pigment ratio, the binder can be added to the mixture either in the solid state or in the form of a 12–60% strength solution. The dispersions for the novel magnetic recording media have very good dispersion stability and flow limits.

The dispersion is then applied to the nonmagnetizable base with the aid of a conventional coating apparatus, for example a knife coater. Suitable nonmagnetizable bases are the conventional bases, in particular films of linear polyesters, such as polyethylene terephthalate, in general in thicknesses of from 4 to 200 μm, in particular from 60 to 36 μm. Before the still liquid coating mixture is dried on the base, which is advantageously carried out at from 50° to 90° C. in the course of from 2 to 5 minutes, the anisotropic magnetic particles are oriented along the intended recording direction by the action of a magnetic field. Thereafter, the magnetic layers are calendered and compacted on a conventional apparatus by being passed between heated and polished rollers, if necessary under pressure, at from 50° to 100° C., preferably from 60° to 90° C. The thickness of the magnetic layer is in general from 2 to 20, preferably from 3 to 15, μm.

The Examples which follow illustrate the invention and compare it with prior art experiments. In the Examples and Comparative Experiments, parts and percentages are by weight, unless stated otherwise.

EXAMPLE 1

72.9 parts of an acicular cobalt-doped gamma-iron oxide powder having an $H_c$ of 52 kA/m and a BET surface area of 43 m$^2$/g were dispersed for 72 hours together with 8.1 parts of a $CrO_2$ pigment whose $H_c$ was 42 kA/m and whose BET surface area was 28 m$^2$/g, 4.05 parts of a spherical $Al_2O_3$ powder having a mean particle diameter of 0.4 μm and 0.81 parts of a fine carbon black product in 31.15 parts of a 13% strength solution of a thermoplastic polyurethane obtained from adipic acid, butane-1,4-diol and 4,4'-diisocyanatodiphenylmethane in a mixture of equal amounts of tetrahydrofuran and dioxane, 10.13 parts of a 20% strength solution of a phenoxy resin obtained from bisphenol A and epichlorohydrin and having a mean molecular weight of 30,000 and a hydroxyl content of 6%, 2.7 parts of a 25% strength solution of a vinyl chloride/vinyl alcohol/vinyl acetate copolymer having a molecular weight of 25,000 and a further 84.27 parts of the stated solvent mixture in a ball mill which had a capacity of 600 parts by volume and contained 800 parts of steel spheres having a diameter of from 2 to 4 mm, with the addition of 9.72 parts of a dispersant based on a comb polymer consisting of a polyimine main chain and polyester side chains and having a total molecular weight of 60,000. Thereafter, 51.76 parts of the stated polyurethane, 16.82 parts of the phenoxy resin, 4.49 parts of the vinyl chloride copolymer, 2.02 parts of isobutyl stearate and 19.14 parts of the solvent mixture and 0.4 part of stearic acid were added and dispersing was continued for 24 hours.

When dispersing was complete, 4.17 parts of a 50% strength solution of a triisocyanate, prepared from 3 moles of toluylene diisocyanate and 1 mole of 1,1,1-trimethylolpropane in ethyl acetate were added while stirring with a high-speed stirrer. The dispersion was filtered and then applied in the form of a layer to a 19.5 μm thick polyethylene terephthalate film, with simultaneous orientation of the magnetic particles. After drying, the 6.5 μm thick magnetic layer was calendered by being passed between heated rollers under pressure (90° C., nip pressure 200 kg), and the coated film web was slit into 1" wide tapes.

These tapes were subjected to the following tests, the results of which are shown in Table 1.

Durability

A 1,460 m long tape is played 2,000 times on a professional video recorder playing 14.4 m per minute and is rewound after each playback. Thereafter, the heads and the tape are examined for abrasion under the microscope.

Thermal cycling test 1,460 m long tapes are subjected for one week at 85% atmospheric humidity to a cycling test comprising 12 hours at 5° C. and 12 hours at 45° C. Thereafter, the tapes are stored for 24 hours at room temperature, after which the durability test is repeated.

Still life

The still life is the time for which a still frame can be played back on a commercial video recorder as a still frame, i.e. with a stationary magnetic tape and rotating head wheel, until the first drop in output level occurs.

COMPARATIVE EXPERIMENT 1

The procedure described in Example 1 was followed, except that the magnetic material used was a cobalt-doped $\gamma$-$Fe_2O_3$ having a BET surface area of 23 $m^2$/g. The results are shown in Table 1.

COMPARATIVE EXPERIMENT 2

The procedure described in Example 1 was followed, except that the dispersant used was a product prepared from an oxoalcohol of a $C_{13}$–$C_{16}$-fraction with ethylene oxide, propylene oxide and phosphoric acid. The results are shown in Table 1.

COMPARATIVE EXPERIMENT 3

The procedure described in Example 1 was followed, except that the dispersion was prepared without the addition of $Al_2O_3$. The results are shown in Table 1.

COMPARATIVE EXPERIMENT 4

The procedure described in Example 1 was followed, except that the dispersion was prepared without isobutyl stearate. The results are shown in Table 1.

TABLE 1

|  | Example 1 | Comparative Experiment 1 | Comparative Experiment 2 | Comparative Experiment 3 | Comparative Experiment 4 |
| --- | --- | --- | --- | --- | --- |
| Durability | No abrasion | Smearing of head after two cycles | No abrasion | Immediate smearing of head | Immediate smearing of head |
| Thermal cycling test | No abrasion | Smearing of head after two cycles | Immediate smearing of head | Immediate smearing of head | Immediate smearing of head |
| Still life | >420 min. | 2 min. | 20 min. | <1 min. | <1 min. |

EXAMPLE 2

700 parts of an acicular iron powder having a specific surface area of 48 $m^2$/g and a mean particle length of 0.3 $\mu$m and an $H_c$ of of 99 kA/m were dispersed for 46 hours together with 91 parts of a spherical $Al_2O_3$ powder having a mean particle diameter of 0.4 $\mu$m in 722.8 parts of a 13% strength solution of a thermoplastic polyesterurethane obtained from adipic acid, butane-1,4-diol and 4,4'-diisocyanatodiphenylmethane in a mixture of equal amounts of tetrahydrofuran and dioxane, 201.3 parts of a 20% strength solution of a phenoxy resin of bisphenol A and epichlorohydrin, having a mean molecular weight of 30,000 and a hydroxyl content of 6%, in the stated solvent mixture in a stirred ball mill having a capacity of 6,000 parts by volume and containing 2,430 parts of ceramic balls, with the addition of 3.5 parts of stearic acid and 42 parts of a dispersant based on a comb polymer having a polyimine main chain and polyamide side chains. Thereafter, 23.7 parts of methyl stearate were added and dispersing was continued for 5 hours. When dispersing was complete, 58 parts of a 50% strength solution of a triisocyanate prepared from 3 moles of toluylene diisocyanate and 1 mole of 1,1,1-trimethylolpropane in ethyl acetate were added and stirring was continued for a further 15 mintues. The dispersion was filtered and applied in the form of a layer on a 10 $\mu$m thick polyethylene terephthalate film with simultaneous orientation of the magnetic particles. After drying, the 3 $\mu$m thick magnetic layer was calendered by being passed between heated rollers under pressure (90° C., nip pressure 200 kg/cm), and the coated film web was slit into ½" wide tapes. These tapes were used in a commercial V 2000 video recorder to determine the durability, the number of hours until the first drop in output level of 20 dB and 15 $\mu$s duration occurred during playback of a V 2000 video cassette, the still life and the signal/noise ratio, the ratio of the luminance signal of a 100% white image to the noise level, measured using a UPSF interference meter from Rohde and Schwarz (100 kHz). The results are shown in Table 2.

COMPARATIVE EXPERIMENT 5

The procedure described in Example 2 was followed, except that the magnetic material used was an iron powder having an $H_c$ of 92 kA/m and a specific surface area of 24 $m^2$/g. The results are shown in Table 2.

TABLE 2

|  | Example 2 | Comparative Experiment 5 |
| --- | --- | --- |
| Still life | >60 minutes | <30 minutes |
| Durability | >100 hours | <50 hours (tendency to smear) |
| Signal to noise ratio | +9 dB | +4 dB |
| measured against reference tape | | |

EXAMPLE 3

900 g of a cobalt-doped iron oxide having an $H_c$ of 50 kA/m an a specific surface area of 42 $m^2$/g and 54 g of a dispersant as stated in Example 2 together with 850 g of a solvent mixture of equal amounts of tetrahydrofuran and dioxane, 276.9 g of a 13% strength solution of a polyetherurethane having a K value of 60, measured in a 0.5% strength solution in tetrahydrofuran and prepared from a polyester obtained from butanediol and adipic acid (0.42 mole), butanediol (0.55 mole), trimethylolpropane (0.03 mole) and diphenylmethane diisocyanate (1.05 moles) in the abovementioned solvent mixture and 120.1 g of a 20% strength solution of a copolymer of vinyl chloride, dimethyl maleate and diethyl maleate in a ratio of 80:10:10, having a K value of 60, measured in 0.5% strength solution in tetrahydrofuran, in the stated solvent mixture were introduced into a steel ball mill having a capacity of 6 l and containing 8 kg of steel balls having a diameter of from 4 to 6 mm, and were dispersed for 90 hours. In the subsequent phase, 578 g of the polyurethane solution, 250 g of the stated copolymer solution, 0.9 g of silicone oil, 0.9 g of hydroquinone, 1.8 g of n-butyl stearate and 9 g of isostearic acid were added. Dispersing was continued for a further 2 hours, after which the dispersion was removed from the mill and filtered under pressure through a filter having 5 μm pores. After filtration, 6.7 g of a 75% strength solution of a trisocyanate of 3 moles of toluylidene diisocyanate and 1 mole of trimethylolpropane in ethyl acetate were added per kg of dispersion, while stirring vigorously. Immediately thereafter, the dispersion was applied to a 12 μm thick polyethylene terephthalate film by means of a conventional knife coater. The coated film was dried at from 50° to 90° C. After drying, the magnetic layer was compacted and calendered by being passed between rollers heated at 70° C. under a nip pressure of 200 kp/cm, so that the thickness of the magnetic layer was 4.5 μm, and was then slit into 3.81 mm wide tapes for audio use.

The average peak-to-valley height $R_z$ of the magnetic layer was measured perthometrically, and the gloss was measured using a reflectometer from Lange (measuring head 60° C.). The magnetic properties were measured in a magnetic field of 100 kA/m, these properties being the coercive force $H_c$ in [kA/m], the residual induction $M_r$ in [mT] and the orientation ratio Rf as a ratio of $M_r$ in the playing direction to that in the crosswise direction. The electroacoustic values were determined according to DIN 45,501, DIN 45,403 and DIN 45,512, sheet 12, against the reference tape IEC II U 564 W.

The mechanical properties were determined in the following tests:

Abrasion behavior in the recorder

The number of cycles in the recorder until the occurrence of a drop in output level of 2 dB is stated as the life; the resulting abraided material on the erase head, audio head and capstan is removed by means of an adhesive tape and rated on a scale from 1 (no abrasion) to 6 (very pronounced abrasion).

Coating shed on paper

A 167 cm loop of the tape is pulled at a speed of 24 cm/sec over an abrasive paper, the tape tension being 50 p. After a running time of 7 minutes, the coloration formed on the paper as a result of abrasion is assessed and rated on a scale in which mark 1 means no coloration and mark 10 means very pronounced coloration.

The test results are shown in Table 3.

EXAMPLE 4

The procedure described in Example 3 was followed, except that, instead of 54 g of the dispersant as stated in Example 2, only 27 g of this dispersant and a further 27 g of a commercial dispersant prepared from oxoalcohols ($C_{13}$–$C_{16}$-fraction), ethylene oxide, propylene oxide and polyphosphoric acid were used. The results are shown in Table 3.

COMPARATIVE EXPERIMENT 6

The procedure described in Example 4 was followed, except that exclusively 54 g of a commercial dispersant based on polyphosphoric ester were used. The results are shown in Table 3.

COMPARATIVE EXPERIMENT 7

The procedure described in Example 3 was followed, except that 900 g of a coarse $\gamma$-$Fe_2O_3$ prepared from goethite and having a coercive force of 30 kA/m and a specific surface area of 24 $m^2$/g were used, 18 g of the dispersant as stated in Example 2 being employed in Experiment 7a), 36 g of the said dispersant in Experiment 7b) and 54 g of the said dispersant in Experiment 7c). The other components remained unchanged in type and amount. Owing to the lower coercive force, the electroacoustic measurements had to be carried out against the IEC I reference tape. The results are shown in Table 3.

TABLE 3

|  | Example 3 | Example 4 | Comparative Experiments | | | |
|---|---|---|---|---|---|---|
|  |  |  | 6 | 7A | 7b | 7c |
| Dispersing time phase I | 90 h | 60 h | 90 h | 144 h | 144 h | 144 h |
| Not surface-treated: | | | | | | |
| Average peak-to-valley height (μm) | 0.48 | 0.37 | 0.66 | 0.83 | 0.86 | 0.75 |
| Gloss | 78 | 80 | 58 | 60 | 64 | 68 |
| Surface-treated: | | | | | | |
| Coercive force (kA/m) | 50.5 | 50 | 48.5 | 30.1 | 30.2 | 30.2 |
| Residual induction (mT) | 157 | 160 | 155 | 144 | 145 | 147 |
| Orientation factor | 2.6 | 2.6 | 2.5 | 1.9 | 1.0 | 1.0 |
| Electroacoustic data against reference tape: | IEC II | IEC II | IEC II | IEC I | IEC I | IEC I |
| Sensitivity 315 Hz | −0.5 | 0 | −0.5 | −0.5 | −0.5 | −0.5 |
| 10 kHz | 0 | 0 | −0.5 | 0.3 | 0.5 | 0.5 |
| Maximum output level 315 Hz | −0.5 | 0 | −1 | −1.7 | −1.5 | −1.5 |
| 10 kHz | 0 | 0 | −1 | 1.1 | 1.3 | 1.3 |
| Magnetic tape properties: | | | | | | |
| Coating shed on paper | 3 | 4 | 8 | 6 | 6 | 6 |
| Durability in the recorder | | | | | | |
| Life - cycles | >100 | >100 | >100 | 80 | 90 | 90 |
| Deposits: Erase head | 2 | 2 | 4 | 4 | 4 | 4 |
| Audio head | 1 | 1 | 3 | 4 | 3 | 3 |

TABLE 3-continued

|  | Example 3 | Example 4 | Comparative Experiments | | | |
|---|---|---|---|---|---|---|
|  |  |  | 6 | 7A | 7b | 7c |
| Capstan | 1 | 1 | 2 | 2 | 2 | 2 |

We claim:

1. A magnetic recording medium comprising a nonmagnetic base and, applied thereon, at least one magnetizable layer containing a magnetic material finely dispersed in an organic binder, a dispersant and a lubricant, wherein the magnetizable layer comprises (1) at least one finely divided magnetic material having a BET specific surface area of not less than 25 $m^2/g$, (2) at least one finely divided nonmagnetic metal oxide having a Mohs hardness greater than 5 and a BET specific surface area of not less than 2 $m^2/g$, in an amount of from 1 to 20% by weight, based on the amount of magnetic material, (3) at least one lubricant from the group consisting of silicone resins, polyethylene waxes, paraffins and metal salts of stearic, oleic and myristic acid, in an amount of from 1 to 10% by weight, based on the amount of magnetic material, and (4) a comb block copolymer based on a polyethyleneimine chain having a molecular weight of not less than 2,000 and having side chains selected from the groups consisting of polyamide side chains, polyester side chains and mixtures of polyamide and polyester side chains, said side chains having a molecular weight of not less than 500, as a dispersant, in an amount of from 1 to 20% by weight, based on the amount of magnetic material.

* * * * *

UNITED STATES PATENT AND TRADEMARK OFFICE
CERTIFICATE OF CORRECTION

PATENT NO. : 5,006,406
DATED : April 9, 1991
INVENTOR(S) : Jenoe KOVACS et al.

It is certified that error appears in the above-identified patent and that said Letters Patent is hereby corrected as shown below:

On the Cover Page:

Please Insert:

-- [30] Foreign Application Priority Data

Sep. 16, 1987 [DE] Fed. Rep of Germany
.... 3731066 --

Signed and Sealed this

Twentieth Day of October, 1992

Attest:

DOUGLAS B. COMER

Attesting Officer

Acting Commissioner of Patents and Trademarks